(12) United States Patent
Montojo et al.

(10) Patent No.: US 8,547,954 B2
(45) Date of Patent: Oct. 1, 2013

(54) METHODS AND APPARATUS OF ADAPTING NUMBER OF ADVERTISED TRANSMIT ANTENNA PORTS

(75) Inventors: Juan Montojo, San Diego, CA (US);
Kapil Bhattad, San Diego, CA (US);
Amir Farajidana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 12/547,407

(22) Filed: Aug. 25, 2009

(65) Prior Publication Data

US 2010/0056217 A1 Mar. 4, 2010

Related U.S. Application Data

(60) Provisional application No. 61/092,450, filed on Aug. 28, 2008.

(51) Int. Cl.
*H04J 3/00* (2006.01)
(52) U.S. Cl.
USPC ......... 370/345; 370/465; 370/522; 455/562.1
(58) Field of Classification Search
None
See application file for complete search history.

(56) References Cited

U.S. PATENT DOCUMENTS

| 2008/0112499 | A1 | 5/2008 | Bennett | |
|---|---|---|---|---|
| 2008/0144612 | A1* | 6/2008 | Honkasalo et al. | 370/370 |
| 2009/0122740 | A1 | 5/2009 | Bouazizi | |
| 2010/0039970 | A1* | 2/2010 | Papasakellariou et al. | 370/310 |
| 2010/0046412 | A1 | 2/2010 | Varadarajan et al. | |
| 2011/0216845 | A1* | 9/2011 | Nakao et al. | 375/295 |
| 2011/0269417 | A1* | 11/2011 | Dwyer et al. | 455/134 |

FOREIGN PATENT DOCUMENTS

| KR | 20060029159 A | 4/2006 |
|---|---|---|
| WO | 2009102724 A1 | 8/2009 |

OTHER PUBLICATIONS

3GPP: "3rd Generation Partnership Project; Technical Specification Group Radio Access Network; Evolved Universal Terrestrial Radio Access (E-UTRA) Radio Resource Control (RRC); Protocol Specification (Release 8)" 3GPP TS 36.331 V8.2.0, [Online] May 2008, p. 65, XP002561738 Retrieved from the Internet: URL:http://www.3gpp.org/ftp/Specs/archive/ 36-series/36.331/> [retrieved on Dec. 29, 2009] p. 65, paragraph 6.2.2.
International Search Report and Written Opinion—PCT/US2009/055217—ISA/EPO—Jan. 15, 2010.

(Continued)

*Primary Examiner* — Kevin C Harper
*Assistant Examiner* — Samina Choudhry
(74) *Attorney, Agent, or Firm* — Liem T. Do

(57) ABSTRACT

Systems and methodologies of intelligently selecting and advertising antenna ports to UEs (e.g., advertising a number of antenna ports to legacy UEs, and another number of antenna ports to new UEs). Such adaptive feature in adjusting the number of antenna ports, enables the base station(s) to intelligently balance requirements of legacy UEs and new UEs (e.g. LTE-A) for an overall efficient operation of the wireless system take as a whole—(e.g., performance gain for new users is deemed an offset for performance degradation for legacy users.) Accordingly, resources that are typically reserved for a Reference Signal (RS) associated with an antenna port, can be freed when such antenna ports are not advertised to the UEs as part of wireless system operation.

44 Claims, 12 Drawing Sheets

(56) References Cited

OTHER PUBLICATIONS

Motorola: "Downlink Multiple Antenna Schemes for LTE-Advanced" 3GPP Draft; R1-083228 LTE-A DL MIMO Motorola, 3rd Generation Partnership Project (3GPP), Mobile Competence Centre ; 650, Route Des Lucioles ; F-06921 Sophia-Antipolis Cedex ; France, no. Jeju; 20080812, Aug. 12, 2008, XP050316642 [retrieved on Aug. 12, 2008] p. 1, paragraph 1-p. 2, paragraph 3.

Nortel: "RS design considerations for high-order MIMO in LTE-A" TSG-RAN1 #54, R1-083157, [Online] Aug. 12, 2008, pp. 1-6, XP002561739 Retrieved from the Internet: URL:http://www.3gpp.org/ftp/tsg-ran/WGI-RL I/TSGRI_54/Docs/> [retrieved on 2009-12-291 p. 2-p. 5.

NTT DOCOMO et al: "SCH Structure and Cell Search Method in E-UTRA Downlink" 3GPP Draft; R1-060042 DL Cell Search, 3rd Generation Partnership Project (3GPP), Mobile Competence Centre ; 650, Route Des Lucioles ; F-06921 Sophia-Antipolis Cedex ; France, vol. RAN WG1, no. Helsinki, Finland; 20060119, Jan. 19, 2006, XP050111185 [retrieved on Jan. 19, 2006] p. 6, paragraph 5-p. 8, paragraph 7.

Taiwan Search Report—TW098129093—TIPO—Nov. 15, 2012.

\* cited by examiner

METHODS AND APPARATUS OF ADAPTING NUMBER OF ADVERTISED TRANSMIT ANTENNA PORTS

CLAIM OF PRIORITY UNDER 35 U.S.C. §119

The present Application for Patent claims priority to Provisional Application No. 61/092,450 entitled "ADAPTING NUMBER OF ADVERTISED TRANSMIT ANTENNAS" filed Aug. 28, 2008, and assigned to the assignee hereof and hereby expressly incorporated by reference herein.

BACKGROUND

1. Field

The following description relates generally to wireless communications and more particularly to adapting number of transmit antennas based on requirements of users in a wireless communication system.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In addition, several advancements are currently being considered for an LTE advanced system, such as Multi User MIMO, higher order MIMO (with 8 transmit and receive antennas), Network MIMO, femto cells with Restricted Association, Pico cells with range extension, larger bandwidths, and the like. LTE advanced has to support legacy UEs (LTE release 8 UEs) while providing additional features to new UEs (and legacy UEs when possible). However, supporting all features in LTE can place cumbersome constraints on LTE advanced design and limit the possible gains. In general, any such feature should be carefully considered with respect to impact to new UEs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with adapting number of antenna ports that are advertised by a base station in a wireless communication system. Such adaptive features in determining the number of antenna ports, enable the base station(s) to intelligently balance requirements of legacy UEs and new UEs (e.g., LTE-A) for an overall efficient operation of the wireless system taken as a whole—(e.g., performance gain for new users is deemed an offset for performance degradation for legacy users.) Such adapting feature can include setting the number of configured antenna ports to different values for legacy UE operation and for new UE operation. Subsequently, the number of configured antenna ports for legacy UE usage and new UE usage can be advertised. In one aspect, by initially reducing number of antenna ports that are advertised to legacy UEs, corresponding resources reserved for Reference Signal (RS) of legacy users can subsequently be freed up for consumption by new UEs. Accordingly, performance of new users can improve at an expense of legacy users, wherein a smooth transition can then be supplied between operation of legacy UEs and new UEs in the wireless communication system.

Such innovative concepts run contrary to market forces that typically demand initial low processing overhead and design systems, by assuming that only legacy UEs are present, (e.g., advertise a number of antenna ports to enhance performance of legacy devices.) However, unexpected benefits with respect to efficiently employing overall system resources are obtained in systems that have both legacy and new UEs, by advertising selected number of antenna ports that can adaptively adjust to system requirement. Such can free resources that are typically reserved for a Reference Signal (RS) associated with an antenna, when associated antenna ports are not advertised to the UEs as part of wireless system operation. According to one particular aspect, a number of transmit antenna ports can be advertised to legacy UEs using existing mechanisms (e.g., through PBCH in LTE), and a larger number of transmit antenna ports can be advertised to new UEs through another mechanism (e.g., through a system information block—SIB—in LTE-A.)

In a related methodology, the base station can determine available users on a wireless system and their related information. Such information can be based on collecting data related to the type of users (e.g., legacy, LTE-A); number of users for each type, relative locations to base station, performance expected for each type based on a given number of antenna ports, type of exchanged information/data, Qos; number of rx antenna for the UEs, or UE capabilities, and the like. Based on such collected information, the base station then determines—such as by calculating or via an inference—the number of antenna ports to be advertised (e.g., for legacy user) for the number of available users. The inference can further be probabilistic—which is, the computation of a probability distribution over states of interest based on a consideration of data and events. Inference can also refer to techniques employed for composing higher-level events from a set of events and/or data. As users enter or exit the wireless network and/or as requirements change, the number of advertised antenna ports can change to adapt to system requirements. Users can then be notified (e.g., paging, notification thru servers) regarding number of available antenna ports. According to a particular aspect, the methodology comprises initially setting a number of transmit antenna ports for legacy User Equipment (UE) operation in a wireless communication system, followed by setting a different number of antenna ports for new UE operation in the wireless communication system, and advertising the transmit antenna ports for the legacy UE operation and the antenna ports for the new UE operation in the wireless communication system. In a related example, such advertising act occurs via a common control channel and/or via Physical Broadcast Channel (PBCH) in Long Term Evolution (LTE.) Moreover, data for each of the legacy UEs and new UEs can be transmitted via antenna ports corresponding thereto.

Another aspect relates to a wireless communications apparatus. The wireless communication apparatus can include at least one processor. The at least one processor can be configured to enable a base station to determine the number of advertised antenna ports. Moreover, the at least one processor can be configured to adapt number of such antenna ports to system requirements—such as advertising a number of antenna ports to legacy UEs, and another number of antenna ports to new UE(s). For example, the system may initially advertise 4 antennas, yet subsequently employ all available 8 antennas even for legacy UEs. As such, the at least one processor can advertise the determined and/or selected antenna ports to the UEs based on an overall efficient operation of the wireless system taken as a whole.

Yet another aspect relates to a communication apparatus. The wireless communication apparatus can include means for determining the number of advertised antenna ports, which enables a base station to determine number of antenna ports to advertise. Moreover, the wireless communication apparatus can include means for adapting the number of antenna ports to system requirements.

Still another aspect relates to a computer program product that can comprise a computer-readable medium. The computer-readable medium can include code for causing a computer to determine number of advertised antenna ports. Such computer-readable medium can further include code for adapting the antenna ports to system requirements—when such requirements change over time. Such code enables adaptive feature in determining the number of advertised antenna ports, and allows the base station(s) to intelligently balance requirements of legacy UE and new UE (e.g., LTE-A) for an overall efficient operation of the wireless system take as a whole—(e.g., performance gain for new users is deemed an offset for performance degradation for legacy users.)

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
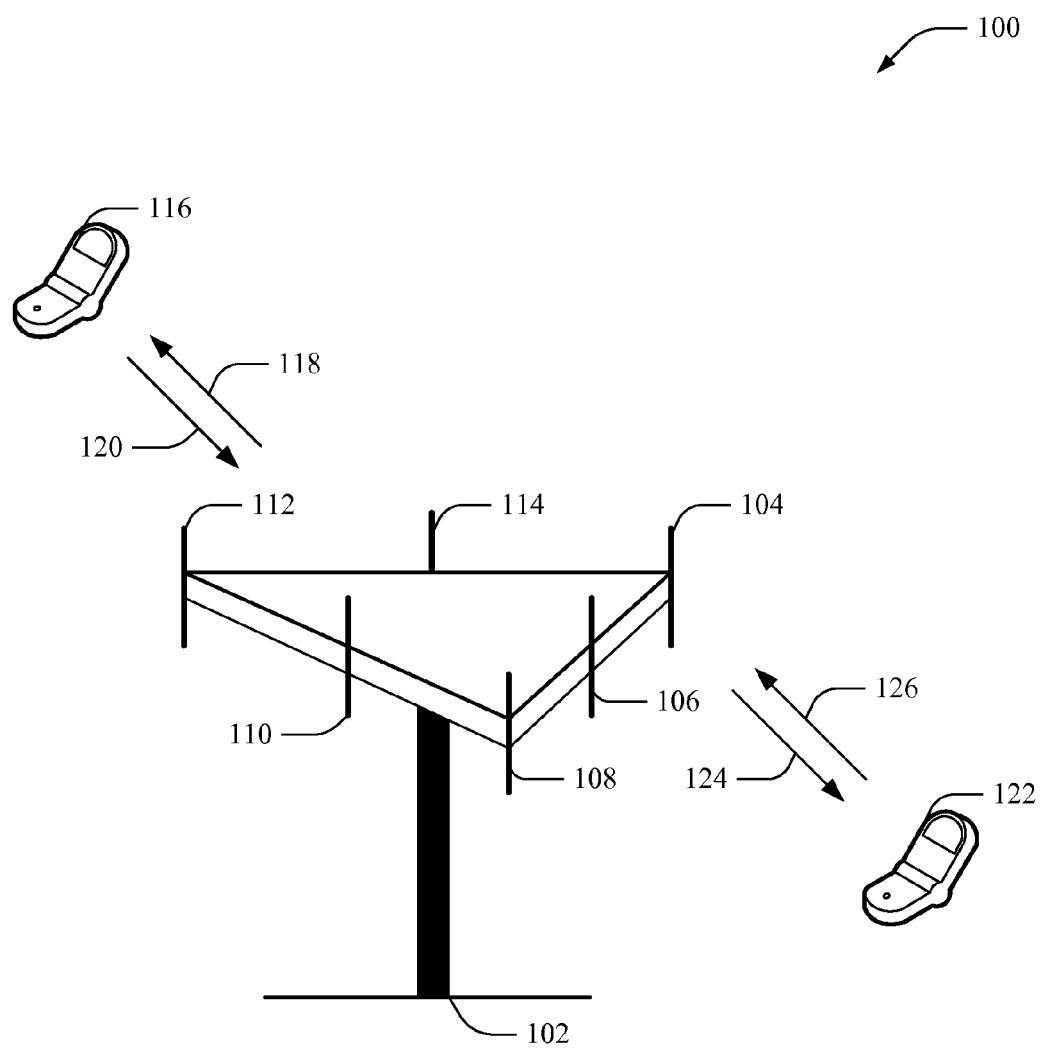
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer related entity and/or an electronic device, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on at least one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), a femto cell, a pico cell, a micro cell, a macro cell, a Home Evolved Node B (HeNB), a Home Node B (HNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claim section should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 illustrates a wireless communication system 100 in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g. processors, modulators, multiplexers, demodulators, demultiplexers, antenna ports, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

It is contemplated that base station 102 can be any type of base station (e.g., macro cell base station, micro cell base station, pico cell base station, femto cell base station, . . . ). Each mobile device 116, 122 can generate a preference for selecting a respective target base station (e.g., base station 102, disparate base station (not shown). According to an illustration, various access control approaches can be leveraged by mobile devices 116, 122 (e.g. operator controlled approach, user and operator controlled approach, . . . ). One or more aspects of the subject innovation enable determining number of antennas that are advertised by the base station 102 in a wireless communication system. Such adaptive feature in determining the number of antennas, enables the base station 102 to intelligently balance requirements of legacy UE and new UE (e.g., LTE-A) for an overall efficient operation of the wireless system 100 taken as a whole. For example, performance gain for new users can be deemed an offset for performance degradation for legacy users. In one aspect, by initially reducing number of antennas that are advertised to legacy UEs, corresponding resources reserved for Reference Signal (RS) of legacy users can subsequently be freed up for consumption by new UEs. Such enables improving performance of new users at an expense of legacy users (e.g., improving peak rates of the new UE at expense of peak rates of the legacy UE), wherein a smooth transition can be supplied between operation of legacy UEs and new UEs in the wireless communication system 100. As used in this application, the term "antenna" can refer to the actual physical antenna. Moreover, the term "antenna port" refers to virtual antennas (beams formed by employing the physical antennas that are advertised to the UE)—wherein a beam refers to a sending the same signal over the different antennas using different gains and phase rotations. It is to be appreciated that for the legacy UEs, each antenna port can correspond to one common reference signal (CRS) port. Furthermore, it is to be appreciated that the number of advertised configured antenna ports for legacy UE operation can be used for transmission of all the control channels (common and dedicated) of legacy and new UEs, while the data transmission of legacy and new UEs employs the corresponding number of antenna ports configured thereto, for example.

Figure 2:
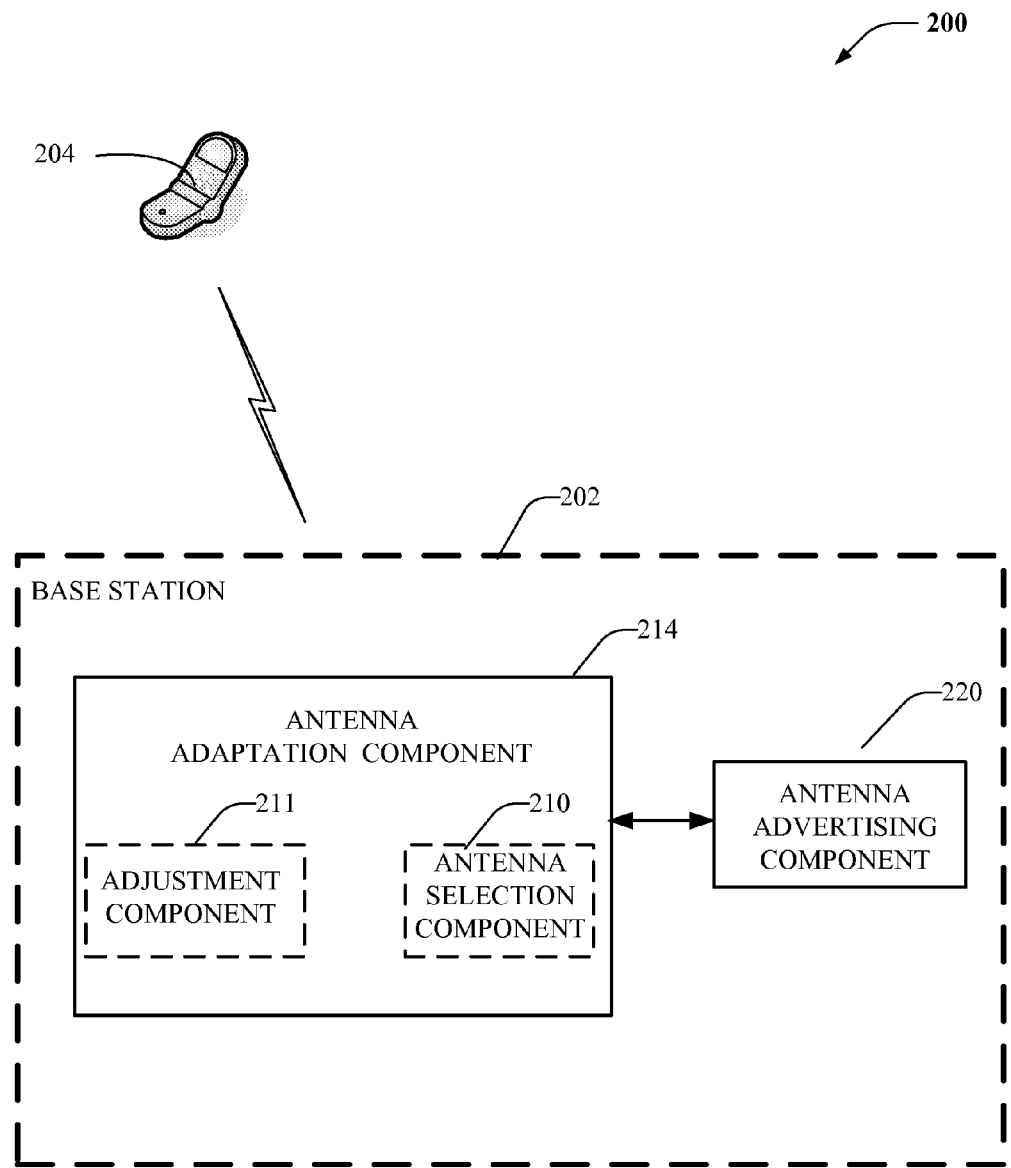
FIG. 2 illustrates an exemplary system that supports determining number of antenna ports and an adaptation thereof according to an aspect of the subject innovation.

FIG. 2 illustrates a wireless communication system 200 in accordance with various aspects presented herein is illustrated. System 200 can comprise one or more base stations 202 in one or more sectors that receive, transmit, repeat, and so forth, wireless communication signals to each other and/or to one or more mobile devices 204. Each base station 202 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 204 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and the like), as will be appreciated by one skilled in the art.

When a base station 202 transmits a signal of a certain signal format on top of another signal format, such as OFDM, the time order of samples of this signal, as received at mobile device 204, could be distorted and/or corrupted. Therefore, mobile device 204 can be configured to rearrange the sampled data and discard the corrupted sampled data in order to improve the signal's detection. Since there can be different types of signal formats utilized, system 200 can provide a platform that allows for adoption of these multiple formats. Thus, system 200 does not utilize the formats independently, but selectively stacks the formats.

The base station 202 further includes an antenna adaptation component 214 that includes an antenna selection component 210 and an adjustment component 211, which operate together to intelligently customize the antenna ports based on system requirements.

The antenna selection component 210 selects number of antenna ports and the adjustment component 211 can increase/decrease number of selected antenna ports. For example, the adjustment component adjusts number of the antenna ports to requirements of the wireless communication system.

Such adaptive feature in adjusting the number of antenna ports, enables the base station 202 to intelligently balance requirements of legacy UE and new UE (e.g., LTE-A) for an overall efficient operation of the wireless system taken as a whole—(e.g., performance gain for new users is deemed an offset for performance degradation for legacy users.) Put differently the antenna adaptation component adapts number of antenna ports to intelligently balance between requirements of a legacy UE(s) and a new UE(s) for the overall efficient operation of the wireless communication system. Likewise, the antenna advertising component 220 notifies users of available antenna ports.

In one aspect, by initially reducing number of antenna ports that are advertised, corresponding resources reserved for Reference Signal (RS) of legacy users can subsequently be freed up for consumption by new UEs. Accordingly, performance of new users can be improved at an expense of legacy users, wherein a smooth transition can be supplied between operation of legacy UEs and new UEs in a wireless communication system. Such innovative concept runs contrary to market forces that typically demand initial low processing overhead. It has been found that by increasing processing overhead related to advertising selected number of antenna ports that can adaptively adjust to system requirement, unexpected benefits with respect to efficiently employing overall system resources are obtained. As such, resources that are typically reserved for a Reference Signal (RS) associated with an antenna, can be freed when associated antenna ports are not advertised to the UEs as part of wireless system operation. Hence, the antenna advertising component 220 advertises the antennas ports, to accommodate the changing requirements of the communication system.

According to a related aspect, the antenna adaptation component 214 sets a number of transmit antenna ports for legacy User Equipment (UE) operation in a wireless communication system—via the adjustment component 211. Such adjustment component 211 can further set a different number of transmit antenna ports for new UE operation in the wireless communication system, wherein the antenna advertising component 220 can subsequently advertise antenna ports for the legacy UE operation and the new UE operation in the wireless communication system.

In particular, in LTE Release 8 the number of transmit antenna ports is advertised through Physical Broadcast Channel (PBCH). Moreover, in conventional systems the number of transmit antenna ports is determined by attempting to blindly decode PBCH for different number of advertised transmit antenna ports while checking which possibility works. Furthermore, Release 8 supports advertising 1, 2 or 4 transmit antenna ports. Reference Signals (RS) corresponding to each advertised transmit antenna has to be sent as mandated in the standard. Such is required as the UE has to inform the base station about the channel quality being observed on the different antenna ports. For example, the Channel quality information can be employed by an eNodeB to make decision on the MIMO scheme appropriate for the UE. The number of resources occupied by RS can increase as the number of advertised antenna ports increases. Advertising more antenna ports has the potential to supply additional MIMO gains. However, the efficiency of the system can be significantly reduced as more RS symbols are being transmitted. The following describes exemplary scenarios wherein advertising a fewer number of antenna ports for legacy users improves the performance for non-legacy as well as legacy UEs.

Supporting Higher Order MIMO with 8 Transmit Antenna Ports

In one aspect, a design can be considered wherein 2 transmit antenna ports (associated with antenna 1 and 2) are advertised for legacy users. Subsequently, new users can be informed of the 8 transmit antenna ports through a new mechanism (e.g., through a new system information block—SIB—in LTE-A.) Such mechanism becomes necessary to support 8 transmit antenna ports, since such arrangement is currently not supported in LTE release 8.

Accordingly, the resources that have been used for antenna ports 3 and 4—assuming 4 antenna ports been advertised—can now be employed to send a low duty cycle RS for antenna ports 3 to 8. For example, instead of transmitting RS for antenna ports 3 and 4 on all subframes, the subject innovation enables: sending RS for antenna 3 and 4 on one subframe; RS for antenna ports 5 and 6 on the next subframe; and RS for 7 and 8 on the next subframe; after which again RS for antenna ports 3 and 4 is transmitted and so on. As such, legacy UEs are not aware of the new RS transmissions and will function only with 2Tx transmissions. Likewise, new UEs observe at least RS for 4 Tx antennas on every subframe, and hence can support 4 Tx MIMO transmissions. In addition, since the RS can cycle through all 8 Tx transmit antennas, such can even support MIMO schemes that involve up to 8 Tx Antennas. Accordingly, support for 8 transmit antennas can be obtained for new UEs by sacrificing 4Tx mode for legacy UEs—yet without increasing overhead. The other option to support 8 Tx transmissions is to introduce more RS for other antennas (5 to 8)—which are sent along with the RS for antenna 1 to 4. Such increases overhead and can make the design inefficient and unfeasible.

Network MIMO Support

Network MIMO refers to a UE being helped by two or more eNBs at the same time in a synchronous network. To support network MIMO a UE may need to estimate the channel from multiple eNBs. Depending on the physical cell ID of the eNBs, the RS of the eNBs can collide and hence may not be sufficient for estimating the channel for network MIMO purposes. Hence, in situations that network MIMO gains can become significant, it is feasible to merely advertise one or two transmit antenna and transmit corresponding RS sequences. As such, one can employ the resources saved by not transmitting other RS, to design a new common RS structure that is more suitable than the current RS design for network MIMO purposes.

Dominant Interference Conditions

In networks that employ range extension/restricted associations it is common to encounter situations, wherein a UE is required to connect to a weaker eNB in presence of dominant interferers. As such, communication can typically be established by partitioning of resources between the dominant interferer and the weaker base station (e.g., by splitting subframes therebetween.) Yet, both these base stations transmit RS as mandated by the standard on all subframes. The UE is unable to listen to its serving eNB on the resources on which the stronger base station transmits its RS even on resources that were assigned to the weaker eNB. Accordingly, adapting the number of advertised antennas can be beneficial in such scenario.

For example, if the macro reduces the advertised number of antenna ports, it increases the number of resources available to picos in its coverage area. Resources employed by macro to transmit its RS become available to each of the picos. If there are several active picos (picos with UEs connected to them) in the coverage area of the macro, such can increase the overall capacity of the system significantly —(since a resource can simultaneously be used by different picos, and hence can compensate for loss the legacy LTEs typically encounter due to reduced MIMO functionality when connected to macro.) More transmit antennas can still be supported for new UEs by transmitting the new RS only on resources reserved for Macro. However, if there are very few active picos, it can be feasible for the macro to support 4Tx transmission for legacy UEs.

Accordingly, the decision for number of transmit antennas to be advertised for legacy UEs through PBCH, can be based on the MIMO gains to legacy users and the performance of new and legacy UEs with other advanced features of LTE-A. Moreover, a different number of transmit antennas can be advertised to new UEs to obtain MIMO gains for new UEs. Furthermore, such decision can be adapted based on current system requirements, since the optimal choice (for number of antennas to advertise to legacy UEs) depends on the current configuration of the network. For example, when only legacy UEs are present in the coverage area of the base station, 4 antennas can be advertised to legacy UEs, and RS can be transmitted for all 4 antennas.

When substantially few legacy UEs are present, only 1 transmit antenna can be advertised for legacy UEs. For example, one way to adapt the number of transmit antennas in LTE, is to perform the change at the eNB and then page all UEs informing them about such system information change. The subject innovation further optimizes design of LTE advanced (e.g. 8 by 8 MIMO) by reducing number of transmit antennas advertised for legacy users.

Figure 3:
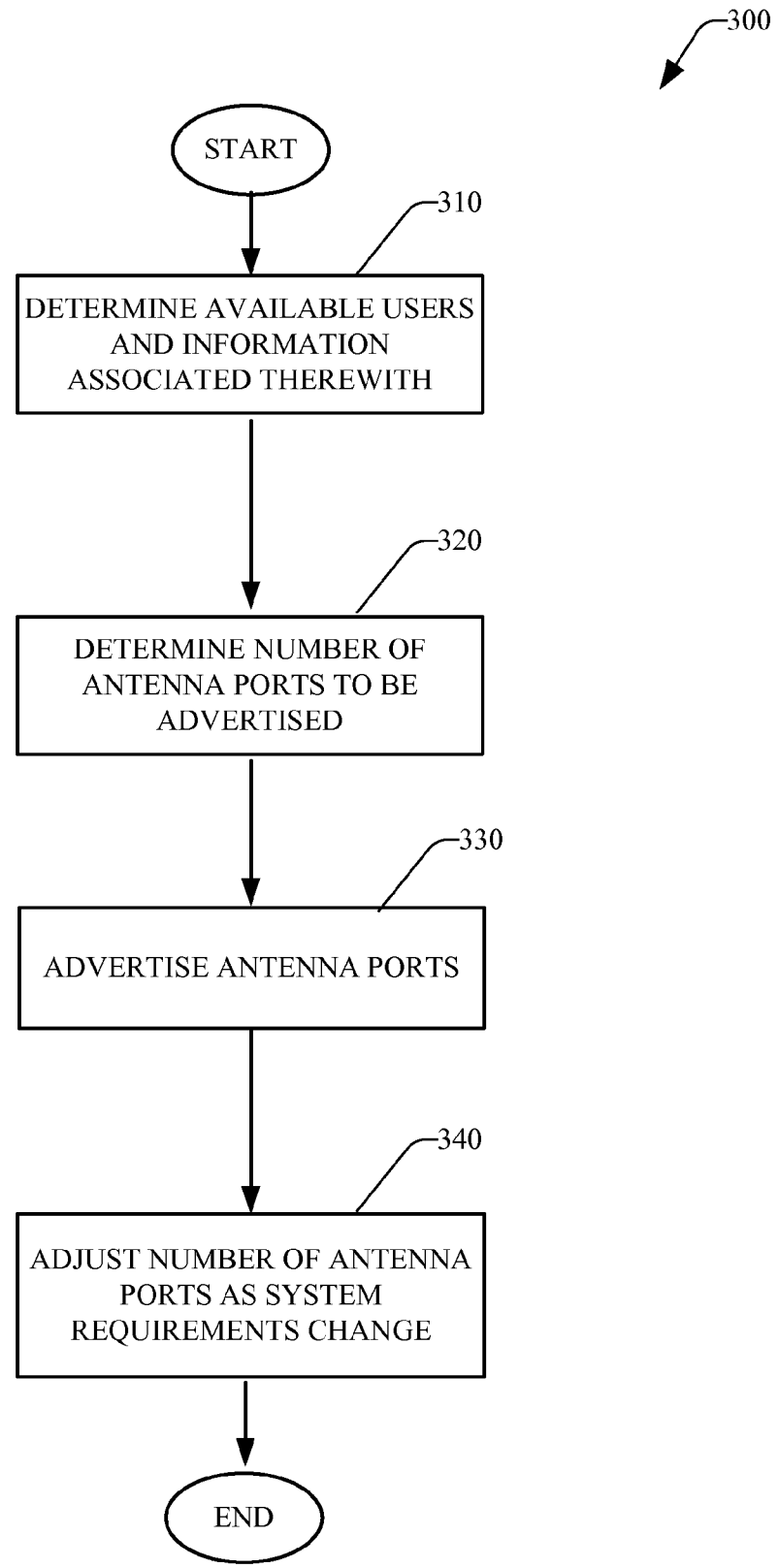
FIG. 3 illustrates a related methodology that enables adapting number of advertised transmit antenna ports according to a further aspect of the subject innovation.

FIG. 3 illustrates a related methodology 300 for adjusting number of antenna ports to adapt to system requirement. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 310 the base station can determine available users on a wireless system and their related information. Such information can pertain to the type of users (e.g., legacy, LTE-A); number of legacy users, number of new users (e.g., numbers for each user type), relative location to base station, performance expected for each type based on a given number of antennas, type of exchanged information, Qos; number of rx antenna for the UEs, and the like. Based on such collected information, and at 320 the base station can then determine—such as by calculation or via an inference-number of antenna ports to be advertised (e.g., for legacy user). The inference can further be probabilistic—which is, the computation of a probability distribution over states of interest based on a consideration of data and events. Inference can also refer to techniques employed for composing higher-level events from a set of events and/or data. As users are entering or exiting the wireless network and/or as requirements change, the number of advertised antenna ports can change to adapt to system requirements. The system can then notify users (e.g., notifying by paging, notification thru servers, and the like) regarding number of available antenna ports. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. At 330, the antenna ports can be advertised and at 340 such numbers can be adjusted as system requirements change.

Figure 4:
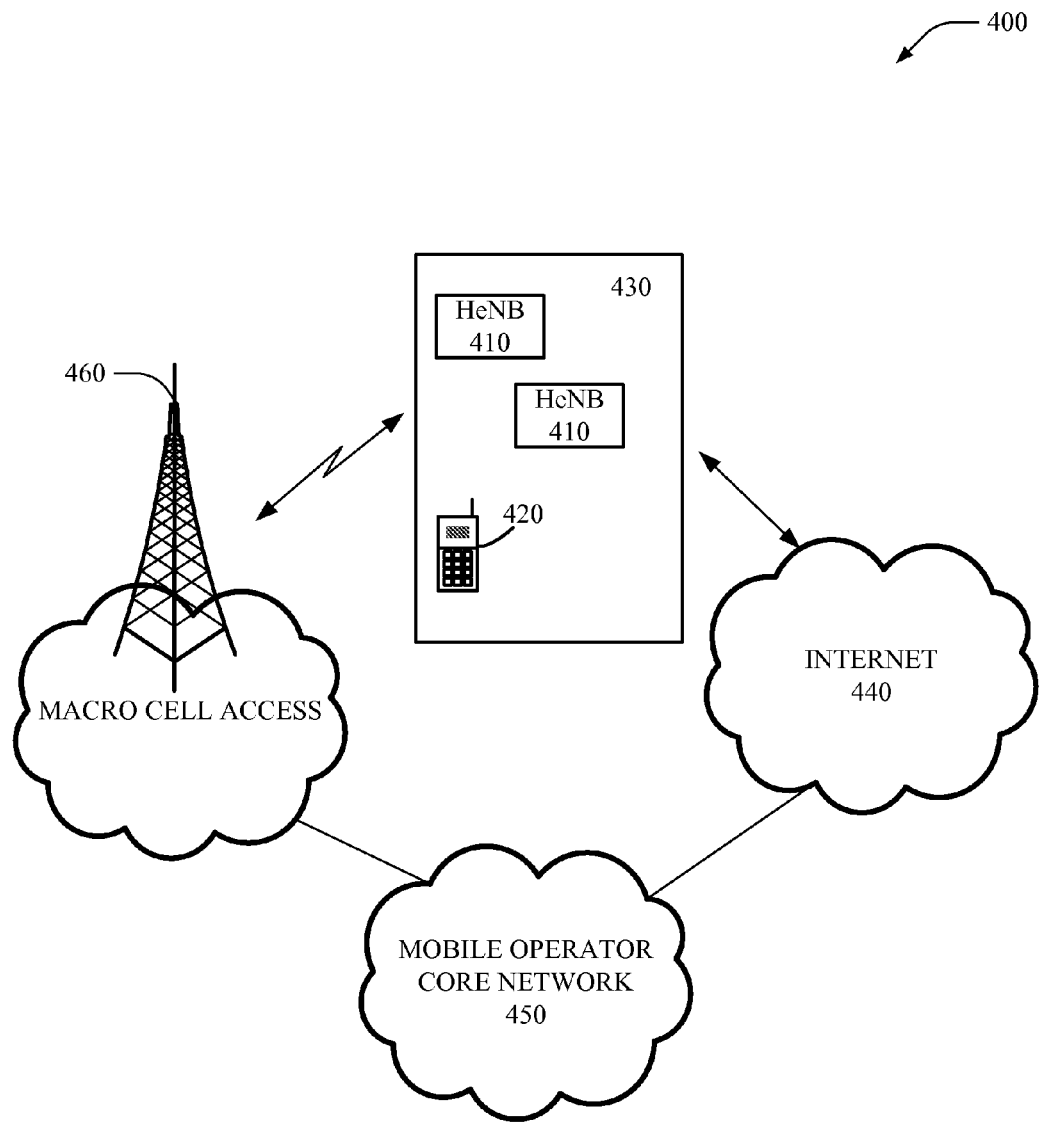
FIG. 4 illustrates an exemplary communication system that enables adaptive features in determining the number of antenna ports.

FIG. 4 illustrates an exemplary communication system 400 that enables adaptive feature in determining the number of antenna ports. Such adaptive feature in determining the number of antennas, enables the base station(s) to intelligently balance requirements of legacy UE and new UE (e.g., LTE-A) for an overall efficient operation of the wireless system 400 taken as a whole—(e.g., performance gain for new users is deemed an offset for performance degradation for legacy users.) In one aspect, by initially reducing number of antenna ports that are advertised, corresponding resources reserved for Reference Signal (RS) of legacy users can subsequently be freed up for consumption by new UEs deployment of access point base stations (e.g., femto cell base stations, . . . ) within a network environment. As shown in FIG. 4, system 400 can include multiple femto cell base stations, which can also be referred to as access point base stations, Home Evolved Node B units (HeNBs), Home Node B unit (HNB), femto cells, or the like. The femto cell base stations (HeNBs 410), for example, can each be installed in a corresponding small scale network environment, such as, for example, in one or more user residences 430, and can each be configured to serve associated, as well as alien, mobile device(s) 420. Each HeNB 410 is further coupled to the Internet 440 and a mobile operator core network 450 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of HeNB 410 can subscribe to mobile service, such as, for example, 3G mobile service, offered through the mobile operator core network 450, and mobile device 420 can be capable to operate both in a macro cellular environment via a macro cell base station 460 and in a residential small scale network environment. Thus, HeNB 410 can be backward compatible with any existing mobile device 420.

It is contemplated that HeNBs 410 can include CSG HeNB(s), hybrid HeNB(s), and/or open HeNB(s). HeNBs 410 can each advertise a respective set of antenna ports and can determine available users on a wireless system and their related information. Such information can pertain to the type of users (e.g., legacy, LTE-A); number of users for each type, relative location to base station, performance expected for each type based on a given number of antenna ports, type of exchanged information, Qos; number of rx antenna for the UEs, and the like. Based on such collected information, the base station can then determine, such as by calculating or via an inference, the number of antenna ports to be advertised (e.g., for legacy user). The inference can further be probabilistic—which is, the computation of a probability distribution over states of interest based on a consideration of data and events. Inference can also refer to techniques employed for composing higher-level events from a set of events and/or data. As users enter or exit the wireless network and/or as requirements change, the number of advertised antenna ports can change to adapt to system requirements. Users can then be notified (e.g., paging, notification thru servers) regarding number of available antenna ports.

Figure 5:
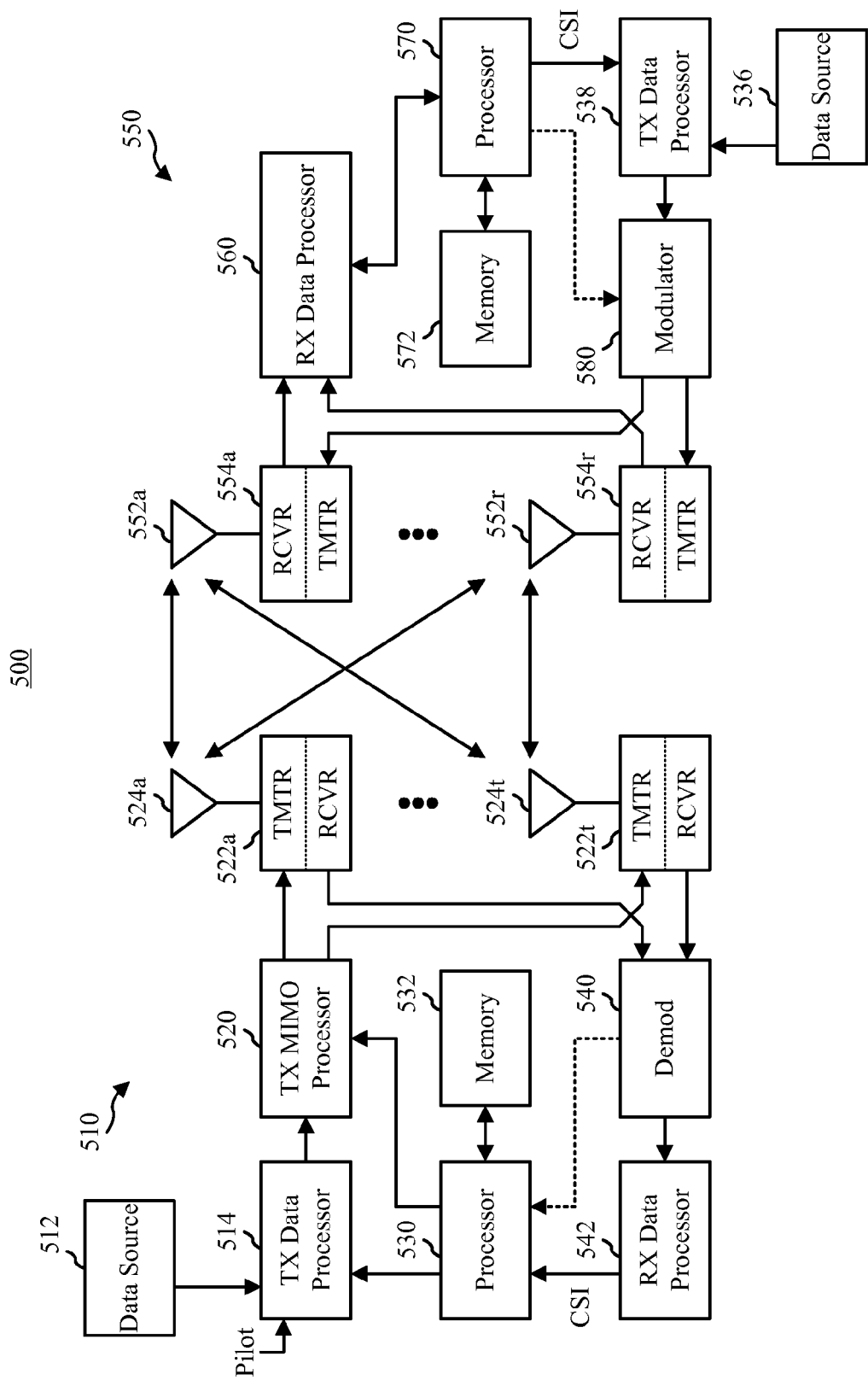
FIG. 5 illustrates an exemplary wireless communication system that can incorporate the adaptive features for antenna port selection in accordance with an aspect of the subject innovation.

FIG. 5 illustrates an exemplary wireless communication system 500 that can incorporate the adaptive features of the subject innovation. The wireless communication system 500 depicts one base station 510 and one mobile device 550 for sake of brevity. However, it is to be appreciated that system 500 can include more than one base station and/or more than one mobile device, wherein additional base stations and/or mobile devices can be substantially similar or different from example base station 510 and mobile device 550 described below. In addition, it is to be appreciated that base station 510 and/or mobile device 550 can employ the systems and/or methods described herein to facilitate wireless communication there between.

At base station 510, traffic data for a number of data streams is provided from a data source 512 to a transmit (TX) data processor 514. According to an example, each data stream can be transmitted over a respective antenna. TX data processor 514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 530.

The modulation symbols for the data streams can be provided to a TX MIMO processor 520, which can further process the modulation symbols (e.g., for OFDM). TX MIMO processor 520 then provides $N_T$ modulation symbol streams to $N_T$ transmitters (TMTR) 522a through 522t. In various embodiments, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 522a through 522t are transmitted from NT antenna ports 524a through 524t, respectively.

At mobile device 550, the transmitted modulated signals are received by NR antenna ports 552a through 552r and the received signal from each antenna 552 is provided to a respective receiver (RCVR) 554a through 554r. Each receiver 554 conditions (e.g., filters, amplifies, and downconverts) a respective signal, digitizes the conditioned signal to provide samples, and further processes the samples to provide a corresponding "received" symbol stream.

An RX data processor 560 can receive and process the $N_R$ received symbol streams from $N_R$ receivers 554 based on a particular receiver processing technique to provide $N_T$ "detected" symbol streams. RX data processor 560 can demodulate, deinterleave, and decode each detected symbol stream to recover the traffic data for the data stream. The processing by RX data processor 560 is complementary to that performed by TX MIMO processor 520 and TX data processor 514 at base station 510. A processor 570 can periodically determine which preceding matrix to utilize as discussed above. Further, processor 570 can formulate a reverse link message comprising a matrix index portion and a rank value portion.

The reverse link message can comprise various types of information regarding the communication link and/or the received data stream. The reverse link message can be processed by a TX data processor 538, which also receives traffic data for a number of data streams from a data source 536, modulated by a modulator 580, conditioned by transmitters 554a through 554r, and transmitted back to base station 510.

At base station 510, the modulated signals from mobile device 550 are received by antenna ports 524, conditioned by receivers 522, demodulated by a demodulator 540, and processed by a RX data processor 542 to extract the reverse link message transmitted by mobile device 550. Further, processor 530 can process the extracted message to determine which preceding matrix to use for determining the beamforming weights.

Processors 530 and 570 can direct (e.g., control, coordinate, manage, etc.) operation at base station 510 and mobile device 550, respectively. Respective processors 530 and 570 can be associated with memory 532 and 572 that store program codes and data. Processors 530 and 570 can also perform computations to derive frequency and impulse response estimates for the uplink and downlink, respectively.

Figure 6:
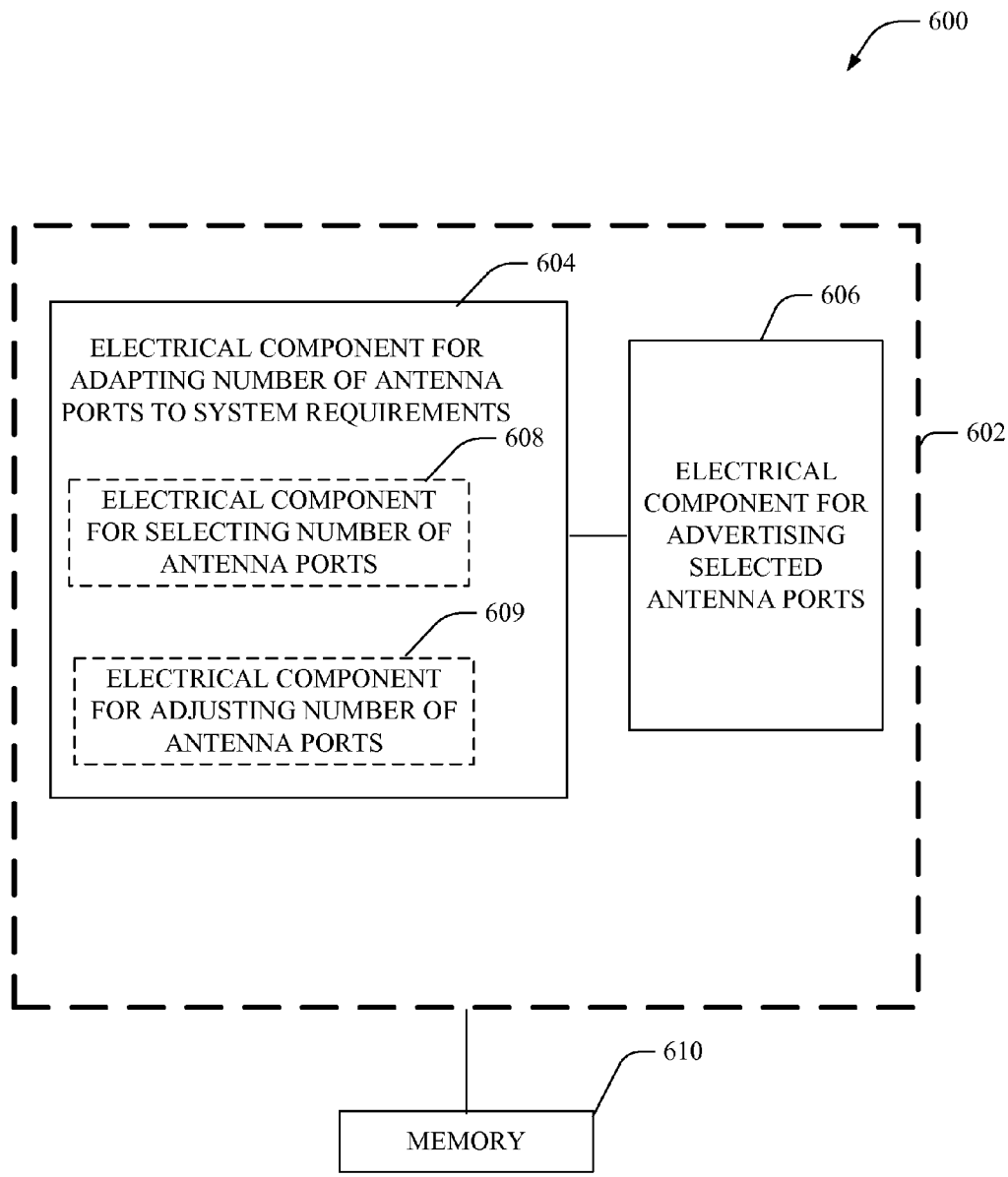
FIG. 6 illustrates a system that provides flexibility for distributing resources by adjusting number of antenna ports according to an aspect of the subject innovation.

FIG. 6 illustrates a system 600 that provides flexibility for distributing resources by adjusting number of antenna ports according to an aspect of the subject innovation. System 600 can reside at least partially within a base station, for instance. As depicted, system 600 includes functional blocks that can represent functions implemented by a processor, software, or combination thereof (e.g., firmware). System 600 includes a logical grouping 602 of electrical components that can act in conjunction. Logical grouping 604 can include an electrical component(s) for adapting number of antenna ports to user requirements (e.g. an adapting means). Such logical grouping 604 further includes logical grouping 608 that includes electrical component(s) for selecting number of antenna ports (e.g., means for selecting) and logical grouping 609 for adjusting number of antenna ports to system requirements 609 (e.g., means for adjusting), as described in detail supra. For example, logical grouping 609 can set a number of transmit antenna ports for legacy User Equipment (UE) operation, and further set a different number of transmit antenna ports for new UE operation, wherein the logical grouping 606 (e.g., advertising means) can subsequently advertise and/or transmit respective antenna ports for the legacy UE operation and the new UE operation in the wireless communication system.

Likewise, logical grouping 606 includes an electrical component(s) for advertising antenna ports to the UEs. As such, a base station can intelligently balance requirements of legacy UE and new UE (e.g., LTE-A) for an overall efficient operation of the wireless system taken as a whole—(e.g. performance gain for new users is deemed an offset for performance degradation for legacy users.)

For example, by initially reducing number of antenna ports that are advertised, corresponding resources reserved for Reference Signal (RS) of legacy users can subsequently be freed up for consumption by new UEs. Accordingly, performance of new users can be improved at an expense of legacy users, wherein a smooth transition can be supplied between operation of legacy UEs and new UEs in a wireless communication system.

Moreover, logical grouping 602 can include a memory 610 that retains instructions for executing functions associated with electrical components 604, and 606. While shown as being external to memory 610, it is to be understood that electrical components 604 and 606 can exist within memory 610.

Figure 7:
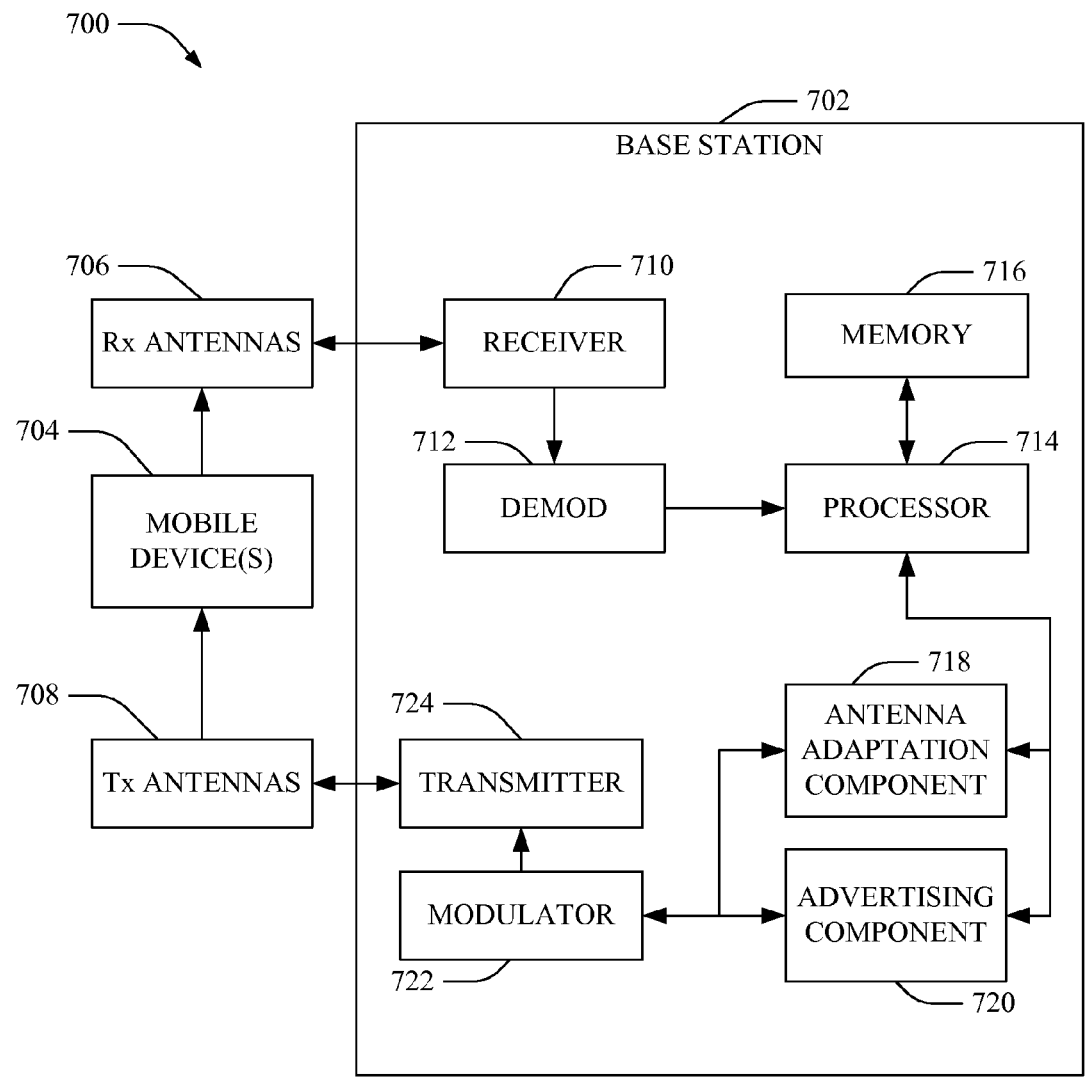
FIG. 7 is an illustration of a system that enables adapting number of antenna ports in a wireless communication environment.

FIG. 7 is an illustration of a system 700 that enables adapting number of antenna ports in a wireless communication environment. System 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described earlier, and which is coupled to a memory 716 that stores data to be transmitted to or received from mobile device(s) 704 and/or any other suitable information related to performing the various actions and functions set forth herein. Processor 714 is further coupled to an antenna adaptation component 718 and an advertising component 720. As explained earlier, the antenna adaptation component 718 enables the base station(s) to intelligently balance requirements of legacy UE and new UE (e.g., LTE-A) for an overall efficient operation of the wireless system taken as a whole—(e.g., performance gain for new users is deemed an offset for performance degradation for legacy users.) The advertising component 720 can advertise number of determined antenna ports to the system.

The base station 702 can further include a modulator 722. Modulator 722 can multiplex a frame for transmission by a transmitter 724 through antennas 708 to mobile device(s) 704 in accordance with the aforementioned description. Although depicted as being separate from the processor 714, it is to be appreciated that identity advertising component 718, mode publicizing component 720, and/or modulator 722 can be part of processor 714 or a number of processors (not shown).

Figure 8:
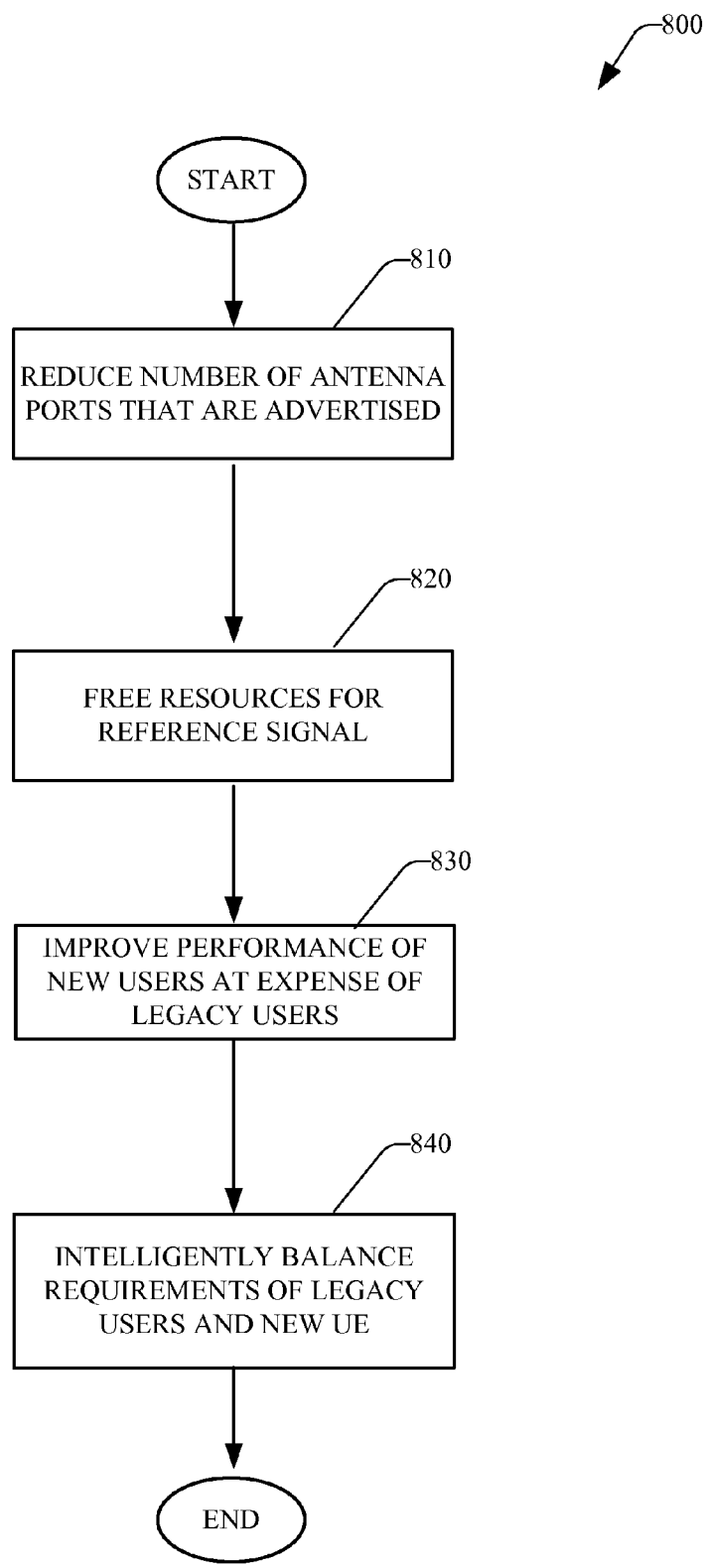
FIG. 8 illustrates a particular methodology according to a related aspect of the subject innovation for adapting number of antenna ports in a communication environment.

FIG. 8 illustrates a particular methodology 800 according to a related aspect of the subject innovation for adapting number of antenna ports in a communication environment. In accordance to methodology 800, initially and at 810, by reducing number of antenna ports that are advertised, corresponding resources reserved for Reference Signal (RS) of legacy users can subsequently be freed up for consumption by new UEs at 820. As such, performance of new users can be improved at an expense of legacy users, wherein a smooth transition can be supplied between operation of legacy UEs and new UEs in a wireless communication system.

As such, resources that are typically reserved for a Reference Signal (RS) associated with an antenna, can be freed when such antenna ports are not advertised to the UEs as part of wireless system operation. According to one particular aspect, a number of transmit antenna ports can be advertised to legacy UEs using existing mechanisms (e.g., through PBCH in LTE), and a larger number of transmit antenna ports is advertised to new UEs through another mechanism.

Figure 9:
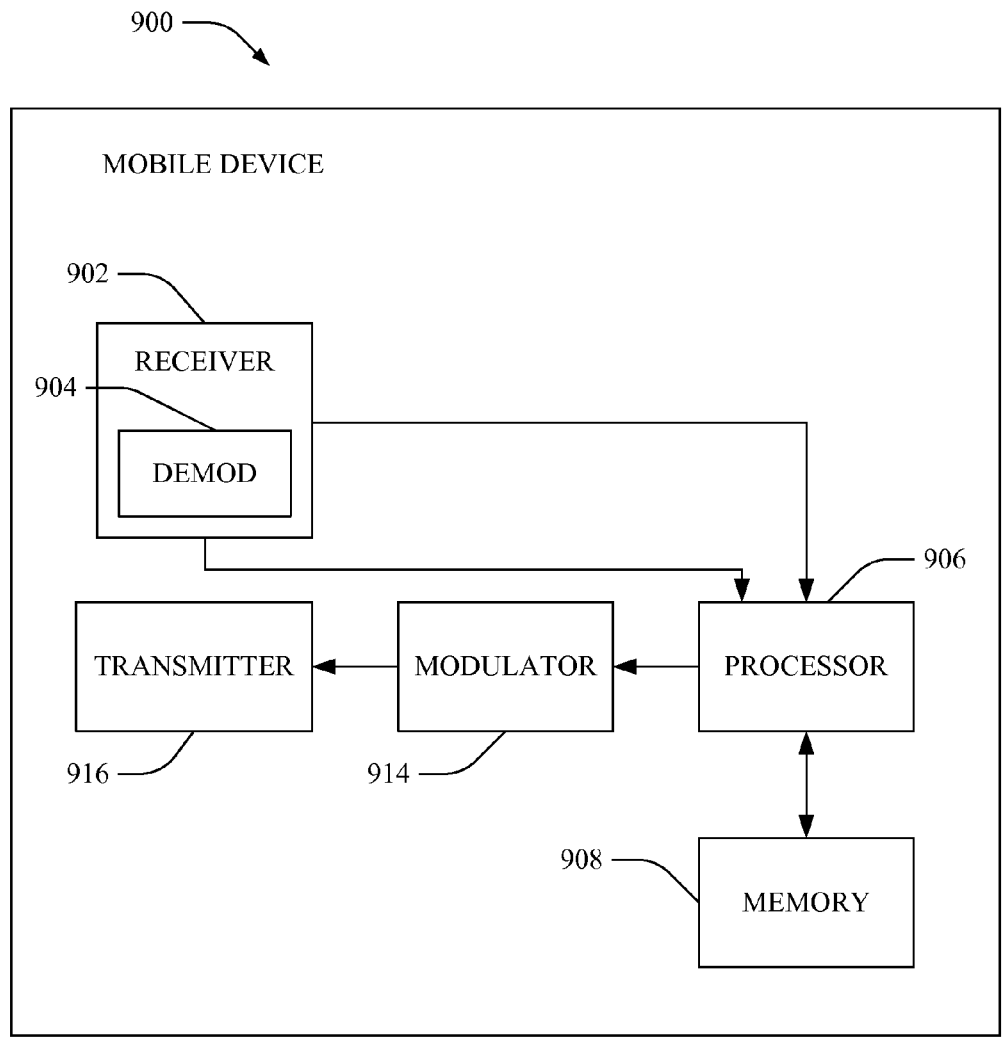
FIG. 9 illustrates a mobile device according to a further aspect of the subject innovation.

FIG. 9 illustrates a mobile device according to a further aspect of the subject innovation. The Mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. According to an example, receiver 902 can obtain an advertised signal that follows an identification of a base station thereto. Processor 906 can be a processor dedicated to analyzing information received by receiver 902 and/or generating information for transmission by a transmitter 916, a processor that controls one or more components of mobile device 900, and/or a processor that both analyzes information received by receiver 902, generates information for transmission by transmitter 916, and controls one or more components of mobile device 900.

Mobile device 900 can additionally comprise memory 908 that is operatively coupled to processor 906 and that can store data to be transmitted, received data, and any other suitable information related to performing the various actions and functions set forth herein. Memory 908, for instance, can store protocols and/or algorithms associated with analyzing obtained signals related to adapting number of antenna ports that are advertised by a base station in a wireless communication system. Such adaptive feature in determining the number of antenna ports, enables the base station(s) to intelligently balance requirements of legacy UE and new UE (e.g. LTE-A) for an overall efficient operation of the wireless system taken as a whole. Furthermore, memory 908 can store protocols and/or algorithms associated with balancing performance gain for new users as an offset for performance degradation for legacy users.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory. Although depicted as being separate from the processor 906, it is to be appreciated that the modulator 914 can be part of processor 906 or a number of processors (not shown).

Figure 10:
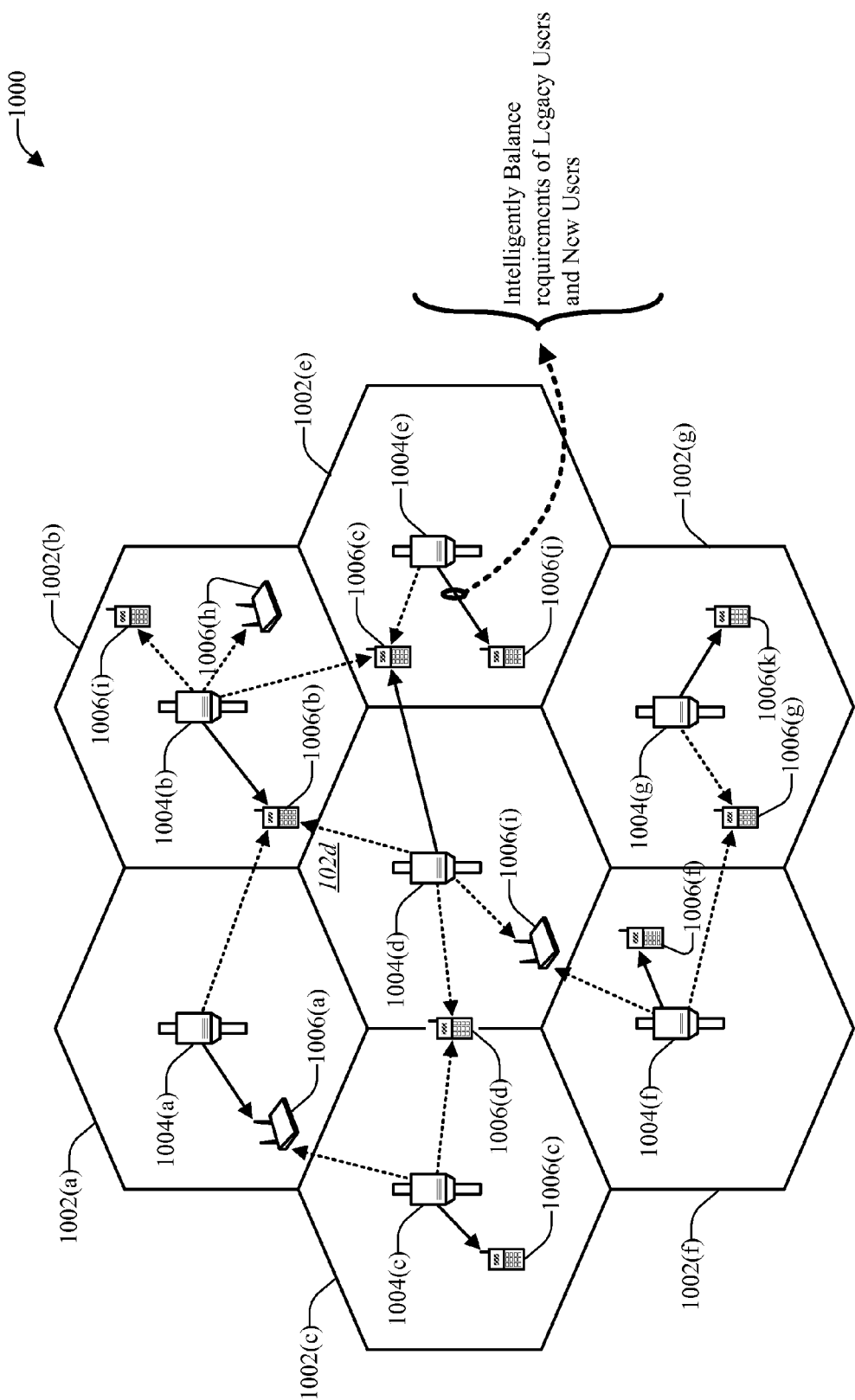
FIG. 10 illustrates an exemplary wireless communication system configured to support a number of users, in which various antenna adaptation aspects may be implemented.

FIG. 10 illustrates an exemplary wireless communication system 1000 configured to support a number of users, in which various adaptation aspects may be implemented. System 1000 provides communication for multiple cells 1002, such as, for example, macro cells 1002a-1002g. Each macro cell 1002a-1002g is serviced by a corresponding access point 1004 (such as access points 1004a-1004g). Each cell 1002a-1002g may be further divided into one or more sectors. Various devices 1006 (including devices 1006a-1006k), are dispersed throughout system 1000. Each device 1006 may communicate with one or more access points 1004 on a forward link (FL) and/or a reverse link (RL) at a given moment, depending upon whether device 1006 is active and whether device 1006 is in soft handoff, for example. Wireless communication system 1000 may provide service over a large geographic region, for example, macro cells 1002a-1002g may cover a few blocks in a neighborhood while adapting number of antenna ports that are advertised by a base station in a wireless communication system. As such, system 1000 enables adapting number of antenna ports that are advertised by the access points and intelligently balancing requirements of legacy UE and new UE (e.g. LTE-A) for an overall efficient operation of the wireless system taken as a whole. For example, if the macro decides to reduce the advertised number of antenna ports, it can increase the number of resources available to picos in its coverage area. Resources employed by macro to transmit its RS become available to each of the picos.

In another example, performance gain for new users is deemed an offset for performance degradation for legacy users. Moreover, the access points 1004 can determine available users 1006 on the wireless system 1000 and their related information. Such information can pertain to the type of users (e.g. legacy, LTE-A); number of users for each type, relative location to base station, performance expected for each type based on a given number of antenna ports, type of exchanged information, Qos; number of rx antenna for the UEs, and the like. Based on such collected information, the access points 1004 can then determine, such as by calculating or via an inference, the number of antenna ports to be advertised (e.g., for legacy user). The inference can further be probabilistic— which is, the computation of a probability distribution over states of interest based on a consideration of data and events. Inference can also refer to techniques employed for composing higher-level events from a set of events and/or data. As users enter or exit the wireless network and/or as requirements change, the number of advertised antenna ports can change to adapt to system requirements. Users can then be notified (e.g. paging, notification thru servers) regarding number of available antenna ports.

Figure 11:
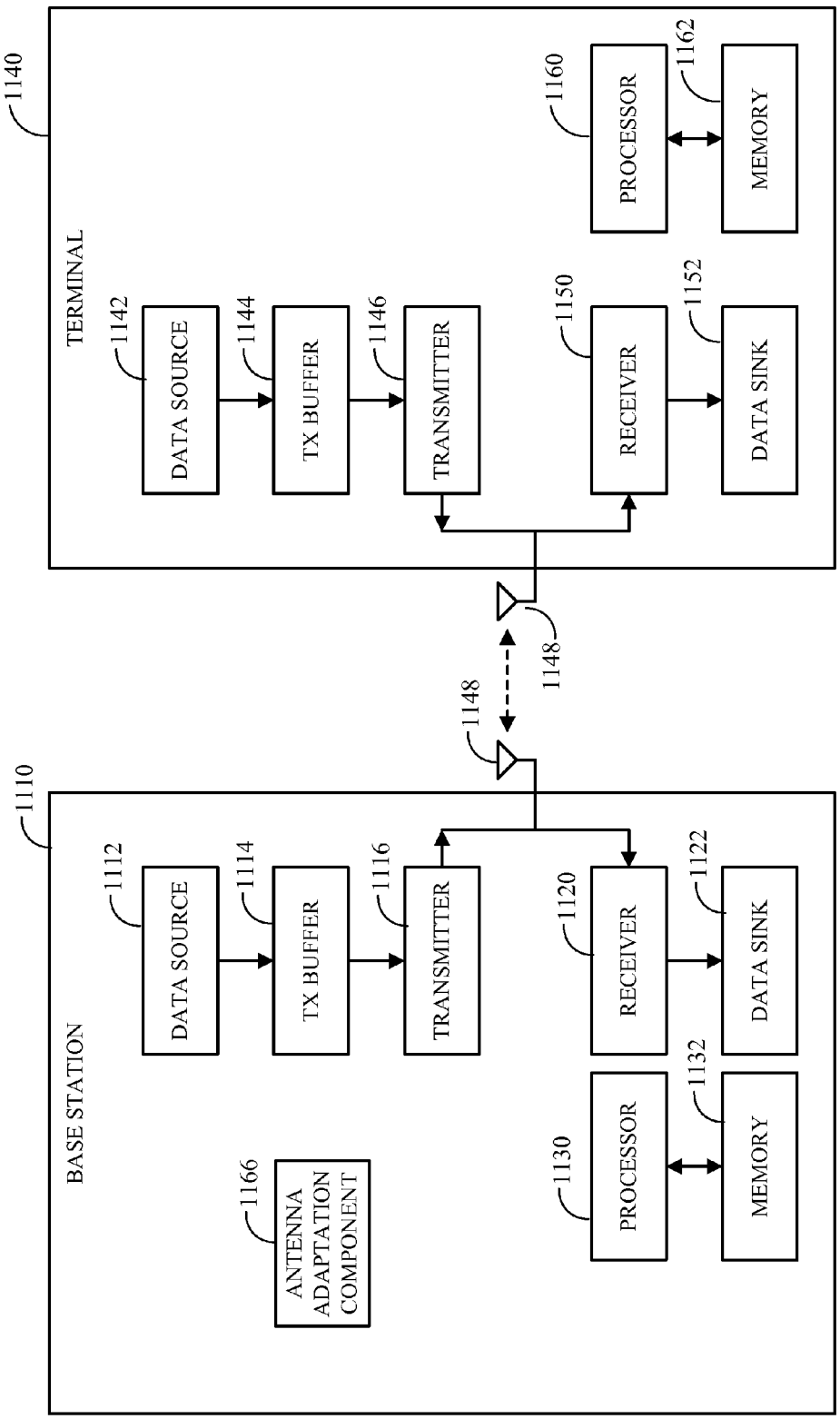
FIG. 11 is a block diagram of a system for adapting number of antenna ports in a communication system in accordance with various aspects provided herein.

FIG. 11 is a block diagram of a system 1100 for adapting number of antenna ports in a communication system in accordance with various aspects provided herein. In one example, system 1100 can include one or more base stations 1110 and one or more terminals 1140, which can communicate with each other via respective antennas 1118 and 1148. The number of antenna ports associated with antennas 1148 can be adapted based on type of user or terminal (e.g., legacy, LTE-A), via the antenna adaptation component 1166. As users enter or exit the wireless network and/or as requirements change, the number of advertised antenna ports can change to adapt to system requirements. Users can then be notified (e.g., paging, notification thru servers) regarding number of available antennas. For example, a number of transmit antenna ports can be advertised to legacy UEs using existing mechanisms (e.g., through PBCH in LTE), and a larger number of transmit antennas is advertised to new UEs through another mechanism. While only one base station 1110 and terminal 1140 are illustrated in system 1100, it can be appreciated that system 1100 can include any number of base stations 1110 and/or terminals 1140, each of which can utilize any suitable number of antenna ports 1118 and/or 1148.

In accordance with one aspect, base station 1110 can communicate data, control signaling, and/or other information in the following manner. Initially, a data source 1112 at base station 1110 can generate and/or otherwise provide information to be communicated to one or more terminals 1140. In one example, data source 1112 can be associated with one or more upper layer applications to provide application data, with a network controller to provide power control and/or scheduling information, and or with any other suitable entity to provide any other information for communication to a terminal 1140. In another example, information can be provided by data source 1112 as a series of packets, such as Packet Data Convergence Protocol (PDCP) Service Data Units (SDUs) or the like.

Information provided by data source 1112 can subsequently be received by a transmit (Tx) buffer 1114, where it is stored pending transmission by a transmitter 1116. In one example, information transmitted by transmitter 1116 can be conveyed as a signal via an antenna 1118 to terminal 1140, where the signal can be received by a receiver 1150 via an antenna 1148. Received data at terminal 1140 can then be provided to a data sink 1152, which can be associated with upper level applications at the terminal 1140, a device controller for the terminal 1140, or the like.

Additionally and/or alternatively, terminal 1140 can communicate information to base station 1110 in a similar manner to that described above using a data source 1142, a Tx buffer 1144, a transmitter 1146, and antenna 1148. Information transmitted by terminal 1140 can then be received by base station 1110 via antenna 1118, receiver 1120, and data sink 1122 in a similar manner to that described above with respect to antenna 1148, receiver 1150, and data sink 1152 at terminal 1140. In one example, base station 1110 can additionally utilize a processor 1130 and/or memory 1132 to act as and/or implement the functionality of one or more of the component parts of the base station described above. As system 1100 further illustrates, terminal 1140 can utilize a processor 1160 and/or memory 1162 in a similar manner.

Figure 12:
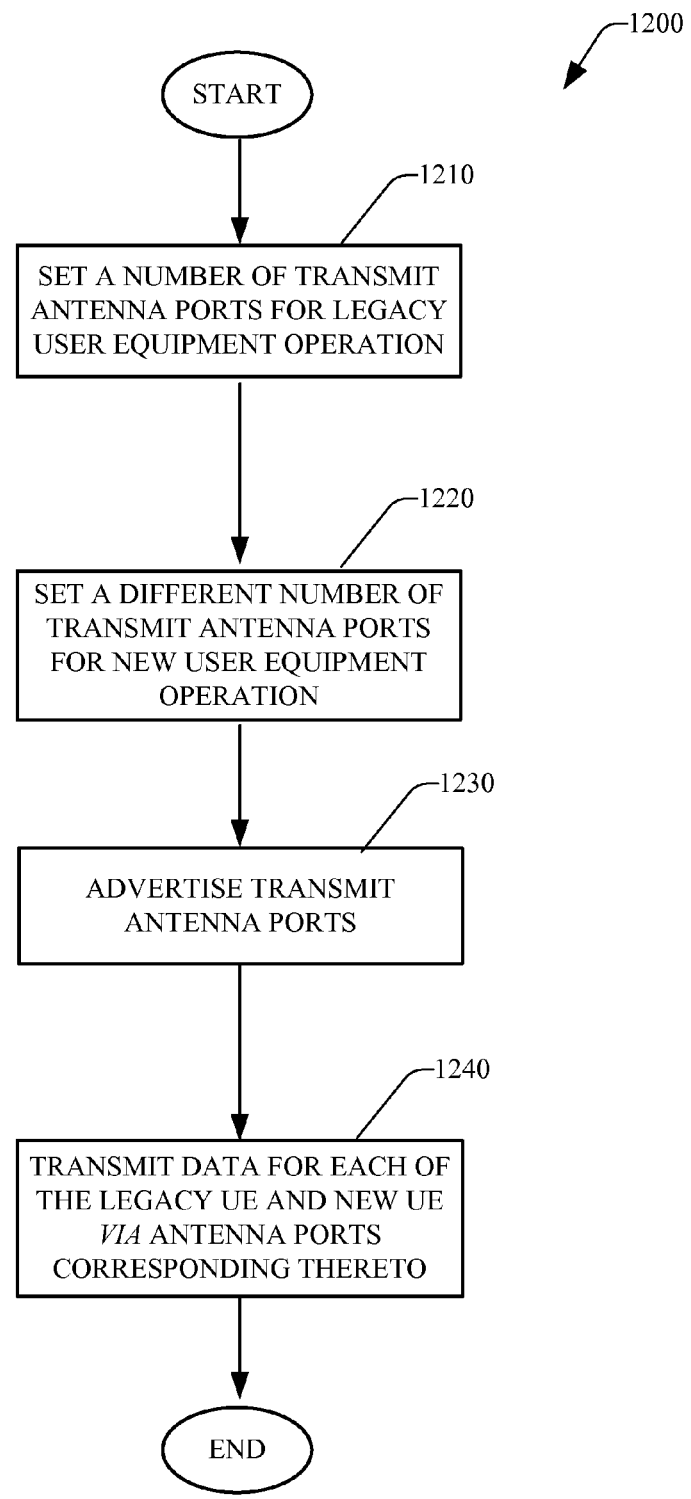
FIG. 12 illustrates a further methodology according to a related aspect of the subject innovation for adapting number of antenna ports.

FIG. 12 illustrates a methodology 1200 that initiates with setting a number of transmit antenna ports for legacy User Equipment (UE) operation in a wireless communication system at 1210. Subsequently, the methodology 1200 proceeds to setting a different number of antenna ports for new UE operation in the wireless communication system at 1220. Next the methodology 1200 proceeds to advertising the transmit antenna ports for the legacy UE operation and the antenna ports for the new UE operation in the wireless communication system at 1230. At 1240, the methodology 1200 proceeds to transmitting data for each of the legacy UEs and new UEs via antenna ports corresponding thereto.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method used in a wireless communication system, the method comprising:
    setting a number of transmit antenna ports for legacy User Equipment (UE) operation in the wireless communication system;
    setting a different number of transmit antenna ports for new UE operation in the wireless communication system;
    advertising transmit antenna ports for the legacy UE operation and transmit antenna ports for the new UE operation in the wireless communication system;
    transmitting all control channels for legacy and new UEs via the transmit antenna ports for the legacy UE operation; and
    transmitting first reference signals via the transmit antenna ports for the legacy UE operation and second reference signals via the transmit antenna ports for the new UE operation;
    wherein the first reference signals are transmitted in all subframes;
    wherein the second reference signals are transmitted in a subset of all the subframes based at least in part on a subframe configuration.

2. The method of claim 1, wherein the advertising act occurs via a common control channel.

3. The method of claim 1, wherein the advertising act occurs via Physical Broadcast Channel (PBCH) in Long Term Evolution (LTE).

4. The method of claim 1, further comprising transmitting data for each of a legacy UE and a new UE via the transmit antenna ports for the legacy UE operation and the new UE operation, respectively.

5. The method of claim 1, wherein the different number of transmit antenna ports for new UE operation is larger than the number of transmit antenna ports for legacy UE operation.

6. The method of claim 4, further comprising improving peak rates of the new UE at expense of peak rates of the legacy UE.

7. The method of claim 1, further comprising reducing number of advertised antenna ports for a legacy UE to free up resources reserved for Reference Signal (RS) for consumption by a new UE.

8. The method of claim 5, further comprising determining antenna ports based on collecting information related to number of legacy users, or number of new users, or locations of users relative to a base station, or expected performance for a user or type exchanged data or QoS, or Rx antennas or UE capabilities or a combination thereof.

9. A wireless communications apparatus, comprising:
    at least one processor configured to:
    set a number of transmit antenna ports for legacy User Equipment (UE) operation in a wireless communication system;
    set a different number of transmit antenna ports for new UE operation in the wireless communication system;
    advertise transmit antenna ports for legacy UE operation and transmit antenna ports for new UE operation in the wireless communication system;
    transmit all control channels for legacy and new UEs via the transmit antenna ports for the legacy UE operation; and
    transmit first reference signals via the transmit antenna ports for the legacy UE operation and second reference signals via the transmit antenna ports for the new UE operation;
    wherein the first reference signals are transmitted in all subframes;
    wherein the second reference signals are transmitted in a subset of all the subframes based at least in part on a subframe configuration.

10. A computer program product, comprising:
    a non-transitory computer-readable storage medium comprising:
    code for causing at least one computer to set a number of transmit antenna ports for legacy User Equipment (UE) operation and a different number of transmit antenna ports for new UE operation in a wireless communication system;
    code for causing the at least one computer to advertise antenna ports in the wireless communication system;
    code for causing the at least one computer to transmit all control channels for legacy and new UEs via the transmit antenna ports for the legacy UE operation; and
    code for causing the at least one computer to transmit first reference signals via the transmit antenna ports for the legacy UE operation and second reference signals via the transmit antenna ports for the new UE operation;
    wherein the first reference signals are transmitted in all subframes;
    wherein the second reference signals are transmitted in a subset of all the subframes based at least in part on a subframe configuration.

11. An apparatus, comprising:
    means for setting a number of transmit antenna ports for legacy User Equipment (UE) operation and a different number of transmit antenna ports for new UE operation in a wireless communication system;
    means for advertising transmit antenna ports for legacy UE operation and transmit antenna ports for new UE operation in the wireless communication system; and
    means for transmitting all control channels for legacy and new UEs via the transmit antenna ports for the legacy UE operation; and
    means for transmitting first reference signals via the transmit antenna ports for the legacy UE operation and second reference signals via the transmit antenna ports for the new UE operation;
    wherein the first reference signals are transmitted in all subframes;
    wherein the second reference signals are transmitted in a subset of all the subframes based at least in part on a subframe configuration.

12. A method used in a wireless communication system, the method comprising:

adapting number of antenna ports to intelligently balance between requirements of a legacy UE(s) and a new UE(s) for an overall efficient operation of the wireless communication system;

advertising antenna ports for legacy UE operation and antenna ports for new UE operation in the wireless communication system;

transmitting all control channels for the legacy UE(s) and the new UE(s) via the antenna ports for the legacy UE operation; and transmitting first reference signals via the antenna ports for the legacy UE operation and second reference signals via the antenna ports for the new UE operation;

wherein the first reference signals are transmitted in all subframes;

wherein the second reference signals are transmitted in a subset of all the subframes based at least in part on a subframe configuration.

13. A wireless communications apparatus, comprising:
at least one processor configured to:
adapt number of antenna ports to intelligently balance between requirements of a legacy User Equipment (UE) and a new UE for an overall efficient operation of a wireless communication system;
advertise antenna ports for legacy UE operation and antenna ports for new UE operation in the wireless communication system;
transmit all control channels for the legacy UE(s) and the new UE(s) via the antenna ports for the legacy UE operation; and
transmit first reference signals via the antenna ports for the legacy UE operation and second reference signals via the antenna ports for the new UE operation;
wherein the first reference signals are transmitted in all subframes;
wherein the second reference signals are transmitted in a subset of all the subframes based at least in part on a subframe configuration.

14. The wireless communications apparatus of claim 13, wherein the at least one processor is further configured to advertising the antenna ports to legacy UEs through Physical Broadcast Channel (PBCH) in Long Term Evolution (LTE).

15. The wireless communications apparatus of claim 13, wherein the at least one processor is further configured to reducing number of antenna ports to free up resources reserved for Reference Signal (RS) of legacy UE(s).

16. The wireless communications apparatus of claim 15, wherein the at least one processor is further configured to improving performance of new UE(s) at expense of the legacy UE(s).

17. The wireless communications apparatus of claim 13, wherein the at least one processor is further configured to determining number of available users based on probabilistic inference.

18. The wireless communications apparatus of claim 17, wherein the at least one processor is further configured to changing number of antenna ports based on users entering or exiting the wireless communication system.

19. The wireless communications apparatus of claim 18, wherein the at least one processor is further configured to notifying the users regarding number of available antenna ports.

20. The wireless communications apparatus of claim 18, wherein the at least one processor is further configured to collecting information related to number of legacy users, or number of new users, or locations of users relative to a base station, or expected performance for a user or type exchanged data or Quality of Service (QoS), or Rx antennas or UE capabilities or a combination thereof.

21. The wireless communications apparatus of claim 18, wherein the at least one processor is further configured to advertising antenna ports to the new UE through a system information block (SIB).

22. An apparatus, comprising:
means for adapting number of antenna ports to intelligently balance between requirements of a legacy User Equipment(s) (UEs) and a new UE(s) for an overall efficient operation of a wireless communication system;
means for advertising antenna ports for legacy UE operation and antenna ports for new UE operation in the wireless communication system;
means for transmitting all control channels for the legacy UE(s) and the new UE(s) via the antenna ports for the legacy UE operation; and
means for transmitting first reference signals via the antenna ports for the legacy UE operation and second reference signals via the antenna ports for the new UE operation;
wherein the first reference signals are transmitted in all subframes;
wherein the second reference signals are transmitted in a subset of all the subframes based at least in part on a subframe configuration.

23. The apparatus of claim 22, wherein the means for adapting further comprises means for selecting number of antenna ports.

24. The apparatus of claim 23, wherein the means for adapting further comprises means for adjusting the number of antenna ports to requirements of the wireless communication system.

25. The apparatus of claim 23, wherein the means for adapting further comprises means for reducing the number of antenna ports to free up resources reserved for Reference Signal (RS) of legacy users.

26. The apparatus of claim 23, wherein the means for adapting further comprises means for improving performance of the new UE(s) at expense of the Legacy UE(s).

27. The apparatus of claim 23, wherein the means for adapting further comprises means for determining number of available users based on probabilistic inference.

28. The apparatus of claim 23, wherein the means for adapting further comprises means for changing numbers of advertised antenna ports based on users entering or exiting the wireless communication system.

29. The apparatus of claim 24, wherein the means for advertising further comprises means for notifying users regarding number of available antenna ports.

30. A computer program product, comprising:
a non-transitory computer-readable storage medium comprising:
code for causing at least one computer to adapt number of antenna ports and intelligently balance between requirements of a legacy User Equipment(s) (UEs) and a new UE(s) for an overall efficient operation of a wireless communication system;
code for causing the at least one computer to advertise antenna ports for legacy UE operation and antenna ports for new UE operation in the wireless communication system;
code for causing the at least one computer to transmit all control channels for the legacy UE(s) and the new UE(s) via the antenna ports for the legacy UE operation; and code for causing the at least one computer to transmit first reference signals via the antenna ports for the legacy UE operation and second reference signals via the antenna ports for the new UE operation;

wherein the first reference signals are transmitted in all subframes;

wherein the second reference signals are transmitted in a subset of all the subframes based at least in part on a subframe configuration.

31. The computer program product of claim 30, wherein the non-transitory computer-readable storage medium further comprises code for causing the at least one computer to reduce the number of antenna ports to free up resources reserved for Reference Signal (RS) of legacy users.

32. The computer program product of claim 30, wherein the non-transitory computer-readable storage medium further comprises code for causing the at least one computer to improve performance of the new UE(s) at expense of the legacy UE(s).

33. The computer program product of claim 30, wherein the non-transitory computer-readable storage medium further comprises code for causing the at least one computer to determine number of available users based on probabilistic inference.

34. The computer program product of claim 30, wherein the non-transitory computer-readable storage medium further comprises code for causing the at least one computer to change number of antenna ports based on users entering or exiting the wireless communication system.

35. The computer program product of claim 30, wherein the non-transitory computer-readable storage medium further comprises code for causing the at least one computer to notify users regarding number of available antenna ports.

36. The computer program product of claim 30, wherein the non-transitory computer-readable storage medium further comprises code for causing the at least one computer to determine antenna ports based on collecting information related to number of legacy users, or number of new users, or locations of users relative to a base station, or expected performance for a user or type exchanged data or QoS, or a combination thereof.

37. The computer program product of claim 30, wherein the non-transitory computer-readable storage medium further comprises code for causing the at least one computer to advertise antenna ports to the new UE(s) through a system information block (SIB.)

38. The wireless communications apparatus of claim 9, wherein the at least one processor is further configured to transmit data for each of a legacy UE and a new UE via the transmit antenna ports for the legacy UE operation and the new UE operation, respectively.

39. The computer program product of claim 10, wherein the computer-readable storage medium further comprises code for causing the at least one computer to transmit data for each of a legacy UE and a new UE via the transmit antenna ports for the legacy UE operation and the new UE operation, respectively.

40. The apparatus of claim 11, further comprising means for transmitting data for each of a legacy UE and a new UE via the transmit antenna ports for the legacy UE operation and the new UE operation, respectively.

41. The method of claim 12, further comprising transmitting data for the legacy UE(s) via the antenna ports for the legacy UE operation and data for the new UE(s) via the antenna ports for the new UE operation.

42. The wireless communications apparatus of claim 13, wherein the at least one processor is further configured to transmit data for the legacy UE(s) via the antenna ports for the legacy UE operation and data for the new UE(s) via the antenna ports for the new UE operation.

43. The apparatus of claim 22, further comprising means for transmitting data for the legacy UE(s) via the antenna ports for the legacy UE operation and data for the new UE(s) via the antenna ports for the new UE operation.

44. The computer program product of claim 30, wherein the computer-readable storage medium further comprises code for causing the at least one computer to transmit data for the legacy UE(s) via the antenna ports for the legacy UE operation and data for the new UE(s) via the antenna ports for the new UE operation.

* * * * *